(12) United States Patent
Reid et al.

(10) Patent No.: US 6,569,794 B1
(45) Date of Patent: May 27, 2003

(54) COMPOSITION FOR THERMAL INSULATING MATERIAL

(75) Inventors: Gregor Joseph Reid, Alfreton (GB); Lawrence Stanley Letch, Eastleigh (GB); Hazel Jennifer Rickman, Derby (GB)

(73) Assignee: Draka U.K. Limited, Washington (GB)

( * ) Notice: Subject to any disclaimer, the term of this patent is extended or adjusted under 35 U.S.C. 154(b) by 0 days.

(21) Appl. No.: 09/381,649

(22) PCT Filed: Mar. 23, 1998

(86) PCT No.: PCT/GB98/00875
§ 371 (c)(1),
(2), (4) Date: Jun. 9, 2000

(87) PCT Pub. No.: WO98/43251
PCT Pub. Date: Oct. 1, 1998

(30) Foreign Application Priority Data

Mar. 21, 1997 (GB) ............................................. 97058457

(51) Int. Cl.$^7$ .......................... C04B 35/01; C09K 21/02; C08K 3/20; C08L 83/04
(52) U.S. Cl. ...................... 501/95.2; 252/601; 252/604; 252/609; 252/610; 428/920; 428/921; 501/8; 501/153; 501/154; 524/404; 524/405; 524/431; 524/433; 524/588
(58) Field of Search .......................... 501/8, 95.2, 153, 501/154; 252/601, 604, 609, 610; 524/430, 431, 433, 404, 405, 588; 428/920, 921

(56) References Cited

U.S. PATENT DOCUMENTS

| | | | |
|---|---|---|---|
| 4,189,619 A | * | 2/1980 | Pedlow ........................ 174/48 |
| 4,269,753 A | | 5/1981 | Mine et al. |
| 4,286,013 A | * | 8/1981 | Daroga et al. .............. 428/266 |
| 4,600,634 A | * | 7/1986 | Langer ........................ 428/220 |
| 4,758,612 A | * | 7/1988 | Wilson et al. .................. 524/5 |
| 4,871,477 A | * | 10/1989 | Dimanshteyn .............. 252/609 |
| 5,130,184 A | * | 7/1992 | Ellis ............................ 428/245 |
| 5,167,876 A | * | 12/1992 | Lem et al. ................... 252/602 |
| 5,176,747 A | * | 1/1993 | Panzera et al. ............... 106/35 |

FOREIGN PATENT DOCUMENTS

EP 0 708 455 4/1996

OTHER PUBLICATIONS

English abstract of JP–53012911 A, Feb. 1978, Japan, assigned to Kuratomi.*

* cited by examiner

Primary Examiner—Robert Dawson
Assistant Examiner—Jeffrey B. Robertson
(74) Attorney, Agent, or Firm—Flynn, Thiel, Boutell & Tanis, P.C.

(57) ABSTRACT

Compositions for use as thermal insulation or barriers in articles that are required to function under transient elevated temperature conditions, such as are experienced during a fire. Articles in which compositions according to the invention may be used include electrical and optical cables which have fire resistant properties, electrical fittings such as terminals and cable clips, and void-filling compounds which are required to act as fire barriers. The invention provides a composition that is ductile or flexible at the elevated temperatures experienced during a fire and retains integrity so as to stay in place throughout the fire enabling it to continue to function as a thermal barrier.

31 Claims, 1 Drawing Sheet

COMPOSITION FOR THERMAL INSULATING MATERIAL

Figure 1:
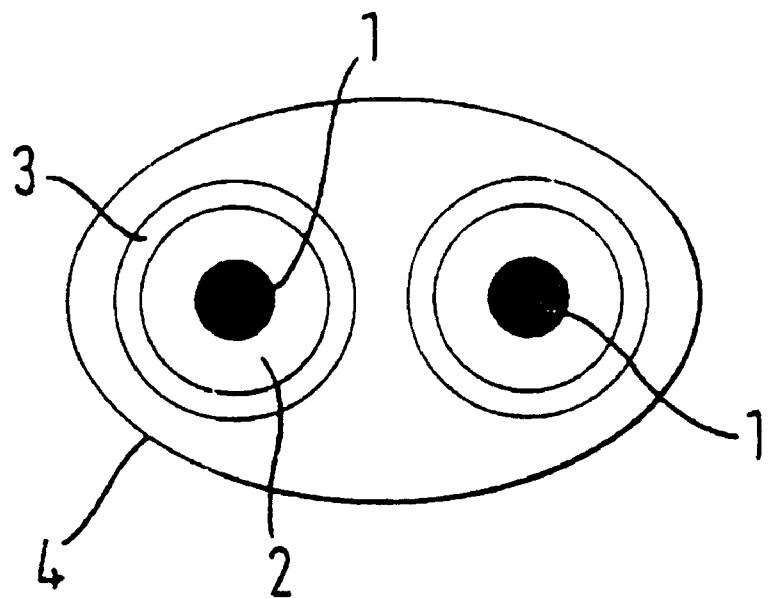

The present invention relates to compositions for use as thermal insulation or barriers in articles that are required to function under transient elevated temperature conditions, such as are experienced during a fire. Articles in which compositions according to the invention may be used include electrical and optical cables which have fire resistant properties, electrical fittings such as terminals and cable clips, and void-filling compounds which are required to act as fire barriers.

Various materials are used as thermal barriers in articles that have to withstand, or continue to function at, elevated temperatures, such as, for example, may occur during a fire. Such materials include, for example, certain metal oxides which have been fused to form a ceramic coating and inert minerals which remain in a stable solid state up to temperatures in excess of the highest temperature under which the article is required to perform. For example, magnesium oxide, which remains essentially inert at the temperatures achieved by a normal organic matter fuelled fire, may be used. The magnesium oxide may be contained within a metallic housing.

Polymer materials have been used. Some polymers, such as silicon rubber, are stable at temperatures up to around 300° C. but above these temperatures decompose to form an insulating ash of silicon dioxide which then remains stable to higher temperatures. The silicon dioxide ash is however fragile and may fall away or fracture. Other polymers, such as polyamides, fuse at temperatures around 300–400 ° C. and tend to flow away with a resultant loss of insulation from part of the article where it is required.

In the electrical and building industries, articles may have to comply with the standards laid down by ISO 834 Part I which requires an article to remain functional when subjected to heating according to a specified time/temperature curve. In many cases the performance of materials under such conditions is compromised by the temperatures at which the component materials change state or react chemically. One class of materials that is used in various forms is the aluminosilicates. In general, as the silicate content of aluminosilicates decreases the fusion temperature increases. Pure alumina fuses at approximately 2,050° C. whereas the naturally occurring muscovite form of aluminosilicate fuses at approximately 1,100° C. In most fire situations, the temperature does not reach 1,100° C. and therefore if muscovite forms part of the fire barrier system, it remains in the solid phase throughout the fire. Such a system is prone to mechanical failure because the barrier system is in a non-ductile state during the fire. If the muscovite is in particle form and held in place by other components of the barrier system which lose integrity as the temperature increases, it is liable to fall away. If the muscovite is in sintered form it is liable to be fractured due to movement caused by thermal expansion, mechanical shock and vibration experienced during the fire. Fracturing allows the fire front and hot gaseous products of combustion to penetrate the barrier system. In applications where the composition is used as a void-filling fire barrier, failure may enable combustion to penetrate and spread the fire, for example from one room into the next or from one floor to the next in a building. In electrical applications, failure of the fire barrier is likely to result in loss of electrical integrity.

There is need for a composition having thermal insulating properties, that is ductile or flexible at the elevated temperatures experienced during a fire and retains integrity so as to stay in place throughout the fire enabling it to continue to function as a thermal barrier.

According to the present invention in a first aspect, a composition for use as thermal insulation or barrier in articles that are required to function under transient elevated temperature conditions, comprises at least two components, a first of the two components, at temperatures within a first lower temperature range, being ductile or flexible, but undergoing a physical or chemical change at temperatures above the lower range but below an upper temperature limit required for fire resistance performance, a second of the two components being dispersed within the first component, and the first component being cohesive in the lower temperature range so as to retain the second component and to stay substantially in place, the second component undergoing a physical or chemical change in transition to a second upper temperature range, the second component being ductile or flexible in the upper temperature range, and being cohesive so as to stay substantially in place at temperatures in the upper temperature range, the lower limit of the upper temperature range being below the upper temperature limit for fire resistance performance.

In the compositions, the first and second components are mixed together. In the event of a fire, the first component or the reaction products of the first component are dispersed throughout the second component at the upper temperature range.

The change of state of the first component may be fusion or decomposition. The change of state of the second component may be fusion or decomposition.

The first component may comprise a polymer. In this context the term polymer is used to include the polymer itself and/or reagents that may be reacted together to form a polymer. The polymer may be a silicon rubber. Silicon rubber is stable at temperatures up to approximately 300° C. but above these temperatures it decomposes to form an ash of silicon dioxide. The silicon dioxide ash is fragile and, on its own, would tend to fall away or fracture. Other polymer such as polyamides and polyesters fuse at temperatures around 300–400° and, on their own, would tend to drip away thereby losing insulation from the article.

In the case where the first component is a polymer which fuses at temperatures above the first temperature range, the presence of the second component in the polymer may serve to increase the viscosity of the fused polymer and thereby enable it to stay in place at temperatures above, say 400° C.

The second component may comprise a glass, a mixture of materials which when fused form a glass or a crystalline material. The second component fuses at a temperature below the maximum temperature which the article is required to withstand. The second component may start to fuse at temperatures above the melting or decomposition of the first component. Where the first component is a material that decomposes to a solid phase residue, the residue may be dispersed within the fused second component and serves to increase its viscosity helping it to remain in place as the temperature increases.

The composition may include a third component which remains stable in a solid phase throughout the upper temperature range so as to increase the viscosity of the fused second component. The third component may be included where there is no solid residue as a result of decomposition of the first component or it may be included where there is a solid residue in order to increase the viscosity of the fused second component further.

The third component may be an oxide of aluminum, silicon or magnesium or a combination of such oxides, such as an aluminosilicate. The third component may remain in a solid state at temperatures up to and above the upper temperature limit required for fire resistance performance, for example 1000° C., it may fuse at temperatures below this upper temperature limit but above the lower limit of the upper temperature range. In this way, the third component may form a ductile system which provides cohesion in a second upper temperature range. For example, aluminosilicate may be treated to reduce its fusion temperature to lie within the upper temperature range and below the upper limit at which the composition is required to perform.

As stated above, aluminosilicates have temperatures of fusion lying in the range from 1,100° C. to 2,050° C. We have found that by treating aluminosilicates with other materials, the temperature of fusion can be lowered to lie within the range of temperatures likely to be experienced in the event of fire. Typically the materials comprise metal oxides or precursors to metal oxides. Preferred metal oxides are alkali metal oxides. We have found that by using sodium oxide in the form of sodium carbonate significant reductions in the fusion temperature of aluminosilicates can be achieved. For example, by treating mica in the form of muscovite with sodium carbonate, the temperatures of fusion can be reduced from around 1,100° C. to around 850° C. As well as sodium oxide, lithium oxide or potassium oxide or combinations of sodium, lithium and potassium oxides may be used. Using such combinations the temperatures of fusion may be lowered to around 500° C. An aluminosilicate treated in this manner may form the third component, or the second component referred to above.

A problem that may be encountered when the second component is made of materials containing sodium or potassium is that the material may be naturally deliquescent making it unsuitable for some applications.

Preferably the composition is non-deliquescent. We have found that suitable materials for the second and/or third components can be prepared using other materials, for example lead oxide containing glasses or the raw materials for such glasses. Other metallic oxides may be used.

The second component may be in the form of glass frits. The use of glass frits, however, has a disadvantage in that it adds considerably to the costs of the composition. Heating the raw ingredients to form the glass and then fitting and grinding the glass particles so that it can be incorporated into the first component involves a considerable amount of energy and several processing stages. The glass frits therefore add considerably to the cost of the composition. We have found that satisfactory second components can be formed by a mixture of the raw ingredients for a glass. Thus, according to a preferred form of the invention the second component comprises a mixture of discrete particles of different oxides which on heating form, in situ, a glass. A possible disadvantage with a second component in this form is that there may be a delay in melting due to the time taken for the ingredients to mix to form the glass and the fusion temperature of the ingredients may be higher than for the glass. On the other hand, the heat required to fuse the ingredients may have a beneficial effect in taking energy away from the fire.

The preferred materials are materials which, on fusion, form a low melting point glass, such as borate glass, phospate glass, sulphate glass, electronic glass. When the first component is a silicone polymer which decomposes to form silicon dioxide, and/or where silicon dioxide is added to the composition some of the silicon dioxide will mix with the fused glass to form a viscous paste, some may dissolve in the fused low melting point glass and thereby making a higher melting point glass and thus increasing its viscosity.

According to the present invention in a second aspect, a composition for use in the manufacture of thermally insulating fire resistant materials includes a polymer and a fusible oxide material mixed or treated with a metal oxide or metal oxide precursor or a combination of metal oxides or metal oxide precursors to form a composition which fuses at a temperature below the temperature likely to be experienced in the event of fire. Typically the temperature of fusion is lowered to be a temperature below 1,000° C. The fusible oxide may be an aluminosilicate which has a fusion temperature above 1000° C. before treatment. For lower temperature ranges a borate may be used, for example zinc borate. The metal oxide may be an alkali metal oxide, for example sodium oxide or lithium oxide or potassium oxide, or a combination of oxides from the group of sodium, lithium and potassium oxides, or it may be lead oxide, antimony trioxide, or precursors of these materials or mixtures of these oxides or precursors.

The amount of lowering of the temperature of fusion is dependant upon the proportions of metal oxide and fusible oxide in the mixture.

Preferably the fusion takes place over a range of temperature which enables the composition to maintain structural integrity over this range of temperatures. One advantage of forming the composition that fuses as a mixture of metal oxides or precursors is that this increases the range of temperature over which fusion takes place.

Preferably the range of temperature is between 450° C. and 1210° C.

As indicated above, the composition may comprise a mixture of the fusible oxide and the metal oxide or metal oxide precursor, or it may comprise the fusible oxide pretreated by already being heated with the metal oxide so as to react with it to form the composition of lowered fusion temperature.

In order to improve the performance of the composition at higher temperatures, refractory materials, that is materials which remain solid and stable at temperatures above the temperature likely to be encountered in the event of a fire, may be added to the composition. By adding such materials, the viscosity of the fused crystalline material is increased so as to prevent the fused crystalline material flowing away from the article. The inclusion of refractory materials may also serve to stabilise the volume of the composition.

According to the present invention in a further aspect, a composition comprises a refractory oxide and a glassy material modified so that structural integrity of the composition is maintained over a wide range of temperatures, the modification consisting of adapting the fusion characteristics of the glassy material and the refractory oxide so that a viscous liquid phase is maintained during various stages of a fire, and structural integrity is maintained through liquid-solid phase bonding. In this way a more effective fire barrier material can be produced.

Suitable refractory oxides include silicon oxide, aluminium oxide and aluminosilicates.

The fusible oxide may have a fusing or softening point in the range 400° to 850°. Lower softening points may be achieved by the addition of other materials.

The modified refractory oxide may be used with other materials to form systems that may be combined with a polymeric host material to provide flexible materials or void-filling compounds. These compounds can be designed to be electrically conductive, semiconductive, insulative or flame retardant, depending upon the application. Alternatively, the material may be used on its own.

Since the conditions experienced during a fire are transitory, there will be a temperature gradient throughout the article so that different parts of the article will be at different temperatures at any time. For example, when the article is an electronic cable, one side of the cable may be closer to the fire than the other and so the temperature on the outside of the cable closest the fire may be much higher than the interior of the cable on the side away from the fire. For this reason, it may not be necessary to provide a system which is flexible and provides integrity at all temperatures. Provided that at all times there are some appropriate parts of the article that are at temperatures at which one or other of the components of the system is providing the necessary integrity, there may be other parts of the article at temperatures at which neither component is in the appropriate phase.

The present invention also contemplates a composition comprising any two or more of the following elements:

- a polymer to provide integrity and ductility at ambient temperatures and throughout a lower elevated rate of temperatures (the range may be, for example, up to 300° C.)
- a glass or fusible oxide component to provide integrity and ductility at a higher temperature range (the range may lie between, for example, 450° C. and for example 850° C.)
- a modified refractory oxide or precursors to a modified refractory oxide to provide integrity and ductility in a still higher temperature range (the range may lie between, for example, 850° C. and, for example 1,000° C.), and
- a refractory material which is stable and remains solid at all temperature conditions experienced during a fire (for example up to 1,000° C.).

The components that are in the solid phase at any particular temperature when other components are in the fused phase may serve to increase the viscosity of the composition and thus improve the integrity of the system at that temperature.

Where the polymer is of a type that decomposes at temperature above the lower range to form a solid residue, the products of decomposition may form the refractory material that is stable at all temperatures or it may be additional to other refractory materials that are stable at all temperatures.

A system may comprise all four components. In such a system, as the host polymer decomposes, the glass or fusible oxide particles fuse to begin the process of substituting a ductile glass for the polymeric phase. As the glass or fusible oxide melts, it binds to or dissolves or bonds to the refractory oxides that form part of the original composition (that is both the stable refractory material and the modified refractory material) and the other refractory materials that may be present as a product of the decomposition of a host polymer. This action increases the liquid phase viscosity.

As the temperature increases, in the still higher temperature range, physical and/or chemical interaction or reaction occurs between the modifying agent, for example the alkali metal oxides, and the refractory oxides to form species capable of fusing at, for example, approximately 850° C. This reaction progresses with some of the as yet unmodified refractory oxide from the solid phase and further with the refractory oxide in a fused phase that is dissolved into the liquid phase formed by the glass or fusible oxide melting. Both the liquid phase formed at the point at which polymer decomposition occurs and the fused modified refractory oxide bond to the stable refractory materials that are present as having been selected so as not to fuse within the temperature range which the article is expected to survive in the event of fire. These non-fusing refractory materials increase the viscosity of the fused refractory oxide and may serve to stabilise its volume.

Minor degrees of absorption of the non-fusing refractory material into the liquid phase formed by fused glass or oxide and the fused modified refractory oxide phases may occur. This action serves to provide a stable matrix even at very high temperatures.

Glasses are non-crystalline solids and therefore have non-uniform molecular bonding. This gives rise to a non-specific broad melting or softening point. The rate of change of viscosity with respect to temperature, although composition dependent, is relatively slow when compared to crystalline solids. By using a mixture of different types of glasses, or a mixture of fusible oxides that form, on heating, a glassy material, compositions can be provided that have an intermediate melting characteristic. By using glasses that devitrify at higher temperatures, interaction between the crystals formed on divitrification and the remaining liquid phase allows the viscosity to be maintained at temperatures at which the liquid phase would otherwise be too fluid to maintain integrity. Thus the upper end of the temperature range at which the composition is effective may be extended.

In applications where electrical insulating properties are important, lead oxide containing glasses are particularly effective. Electronic glasses or glasses that contain species capable of neutralising ionic fragments of the mobile phase may also be used.

For glasses that are slightly electrically conductive in nature, materials with increased alkaline metal content and lower temperatures of fusion are suitable. Chalcogenides and metglas can be used where electrical conductivity is required.

For lower temperature fusing glasses, phosphate, sulphate and boric oxide glasses with various modifiers and stabilisers are typical.

Borate glasses or fusible oxides that form borate glasses are particularly preferred. We have found that by using a mixture containing lead oxide and a borate, a satisfactory composition can be achieved. The mixture may also contain antimony trioxide.

As indicated above, there can be considerable cost savings if the fusible oxide component is present in the composition as a mixture of the raw ingredients for a glassy material rather than as the glass in frit form.

For the formation of a refractory oxide with a lowered fusion temperature, a combination of refractory oxide with alkali metal oxide donating fluxes are included in the composition. Preferably the alkali metal oxide is sodium or lithium oxide or a combination of sodium, lithium and possibly potassium. By using combinations of alkali metal oxides, fusion temperatures below 850° C. can be achieved, even as low as 400–500° C. The flux acts to break up the covalently bonded structure of the refractory oxide. This is important as bond strengths of the refractory oxide are typically 60–110 kcal/mol and are directly related to the temperature at which melting occurs. Therefore, within limits, the quantity of alkali metal oxide added determines the fusion temperature of the modified refractory oxide.

Depending upon the application to which the system is to be employed, the modified refractory oxide can be present in either one of two distinct forms. Where there are no overriding electrical requirements, the system can be applied with the component in an untreated state, that is to say the as yet unmodified refractory material and the modifying agent are co-mixed but un-reacted. This has the advantages of eliminating one step from the manufacturing process and may provide an additional enothermic flame retardant effect through the liberation of non-combustible gases (for example, nitrogen, water or carbon dioxide). In other circumstances, such as where there is a need for electrical insulating properties or the elimination of evolved gasses, the modified refractory oxide may be pre-prepared, that is the components of the system un-modified oxide and modifying agent are fused, fritted and ground before being incorporated in the composition that is applied to form the article. In this way, the gas liberating reactions completed prior to the incorporation to the system into a host polymer or, when using the composition as a coating composition, without further adaptation. The pre-prepared modified oxide may also have advantages in certain applications in that the physical and chemical changes that are taking place as the composition undergoes the temperature change of a fire are simplified which may enable the thermal transitions to be rationalised to provide distinctive ends to the temperature ranges at which the various components of a system perform.

As indicated above, a composition according to the invention does not necessarily include all four components. It may consist merely of the polymer and the fusible oxide or glass, or the polymer, the fusible oxide or glass and the refractory material.

According to the present invention in another aspect, a method for producing a crystalline material with a fusion temperature below the maximum temperature that is likely to be experienced in a fire, for example 1,000° C., comprises adding an alkali metal oxide, or a mixture of alkali metal oxides and precursors to such oxides to a refractory oxide, for example, aluminum oxide, silicon oxide, magnesium oxide and compounds of these oxides, such as for example aluminosilicates, and fusing the resultant composition.

According to the present invention in another aspect, the present invention provides a composition for use in the manufacture of thermally insulating fire resistant materials including a polymer and a mixture of discrete particles of different oxides which, on heating, fuses to form in situ a low temperature fusing glass.

Preferably the polymer is a silicone polymer that decomposes to form oxides of silicon upon heating.

Preferably the mixture fuses at a temperature in the range 450° C. to 850° C.

Preferably the mixture includes a borate, for example zinc borate.

Preferably the mixture includes a metal oxide, preferably lead oxide or antimony oxide or a mixture of lead and antimony oxides.

The composition may also include a refractory material, for example silicon dioxide.

The compositions described above may be used for making a wide variety of articles, by moulding extrusions or other processes.

According to the present invention in a further aspect there is provided an article that is required to perform under transitory elevated temperatures, including thermal insulation comprising any of the compositions described above.

The article may be an electric cable comprising one or more electric conductors. The thermal insulation may constitute the electric insulating material or one or more of the layers of electric insulating material or it may comprise a separate layer. The article may be an electric cable clip or other accessory for an electric cable, or it may be an electrical component.

This invention will now be further described and illustrated by means of the following examples and the accompanying figure, FIG. 1, which shows on enlarged scale a cross section of an electrical cable which includes in its structure a layer of material according to the present invention.

Examples of material compositions according to the invention are as follows. The compositions may be mixed by any conventional means.

EXAMPLE 1.1

An inorganic polymer composition is made up as follows:
1. 100 weight parts organopolysiloxane gum.
2. 10–100 weight parts reinforcing fillers.
3. 1–20 weight parts organic peroxide.
4. 10–120 weight parts lead oxide.
5. 10–90 weight parts antimony trioxide.
6. 1–40 weight parts zinc borate.
7. 20–75 weight parts other fillers and processing aids such as precipitated silica and oils respectively.

EXAMPLE 1.2

A further composition is made up as follows:
1. 100 weight parts organopolysiloxane (0.2 molar percent unsaturated aliphatic hydrocarbon groups).
2. 35–65 weight parts silica filler having a specific surface area of $110\pm20$ m$^2$/g.
3. 2–7 weight parts dicumyl peroxide (40% active on chalk or EPDM carrier system).
4. 45–70 weight parts of lead II oxide.
5. 20–50 weight parts antimony trioxide.
6. 5–13 weight parts zinc borate.
7. 16–30 weight parts of silicone oil (with a dynamic viscosity in the range of 20–20 Pas), 13–29 weight parts precipitated silica filler, and 5–13 weight parts extending filler.

EXAMPLE 1.3

A further example has the following composition:
1. 100 weight parts organopolysiloxane (0.2 molar percent unsaturated aliphatic hydrocarbon groups).
2. 50 weight parts silica filler having a specific surface area of $110\pm20$ m$^2$/g.
3. 4 weight parts dicumyl peroxide (40% active on a chalk or EPDM carrier system).
4. 55 weight parts of lead II oxide.
5. 35 weight parts antimony trioxide.
6. 10 weight parts zinc borate.
7. 23 weight parts of silicone oil (with a dynamic viscosity in the range of 20–40 Pas), 20 weight parts precipitated silica filler, and 10 weight parts silica flcur.

In the above examples, components 4, 5 and 6 are fusible oxide or modifiers; a mixture of components which on heating form a glass or ceramic material at temperatures between 400° C. and 1100° C.

On exposure to fire the materials are exposed to elevated temperatures and undergo structural changes as the temperature rises. Between about 350° C. and 450° C. organopolysiloxane gum (component 1), which is largely responsible for the cohesion and structural integrity of the composition, begins to decompose to form a silicone oxide ash. Ordinarily, this ashing would result in loss of structural integrity. However, with the exemplified compositions the fusible oxides or modifiers (components 4, 5 and 6) start to fuse at temperatures above 400° C. The fusion of these components results in a fused glass or ceramic or semi-ceramic material which gives structural integrity to the overall composition at elevated temperatures where the organopolysiloxane gum has formed an ash. Additionally the fused modifiers may dissolve the ash (silicon oxides) created by the decomposition of the organopolysiloxane gum, resulting in increased viscosity of the fused mixture and increased strength. By dissolving in the fused borate glass material, the oxides of silicon produce a glass of higher melting point and thus the viscosity is increased, partly because of the effect of the undissolved silicon dioxide forming a paste-like composition, and partly by the increase in the melting point.

In the examples the fusible oxides or modifiers (components 4, 5 and 6) consists of a base of lead oxide, antimony trioxide and zinc borate. There materials are effectively a cost effective route to a low temperature borate glass. Other materials that may be incorporated into the modifiers include:
1. lithium oxide
2. boron oxide
3. magnesium oxide
4. sodium oxide
5. potassium oxide, nitrate or carbonate
6. vanadium pentoxide
7. zirconium oxide
8. titanium dioxide
9. precursors to phosphate glasses (e.g. ammonium polyphosphate)
10. precursors to sulphate glasses
11. other electronic glass precursors
12. other water glass precursors
13. strontium oxide or carbonate
14. calcium oxide or carbonate
15. iron oxide
16. barium oxide
17. yttrium oxide
18. vanadium oxide
19. chromium, molybedenum or tungsten oxide The temperature of fusion of the composition can be effected by varying the total amount of modifiers (components 4, 5 and 6) in the overall composition, and the relative ratios of these three individual components. By increasing the total amount of modifiers within the overall composition, the fusion temperature is lowered.

EXAMPLE 2.2

A further example is:
1. 100 weight parts organopolysilioxane gum.
2. 10–100 weight parts reinforcing fillers.
3. 1–20 weight parts organic peroxide.
4. 50–200 weight parts lead oxide.
5. 30–150 weight parts antimony trioxide.
6. 10–70 weight parts zinc borate.
7. 5–50 weight parts other fillers and processing aids such as precipitated silica and oils respectively.

EXAMPLE 2.2

A more specific example is:
1. 100 weight parts organopolysiloxane (0.2 molar percent unsaturated aliphatic hydrocarbon groups).
2. 60–90 weight parts silica filler having a specific surface area of 110±20 m$^2$/g.
3. 2–5 weight parts dicumyl peroxide (40% active on a chalk or EPDM carrier system).
4. 140–170 weight parts of lead II oxide.
5. 90–110 weight parts antimony trioxide.
6. 15–35 weight parts zinc borate.
7. 30–40 weight parts of silicone oil (in the viscosity range of 20–40 Pas).

EXAMPLE 2.3

A still more specific example is:
1. 100 weight parts organopolysiloxane (0.2 molar percent unsaturated aliphatic hydrocarbon groups).
2. 80 weight parts silica filler having a specific surface area of 100±20 m$^2$/g.
3. 4 weight parts dicumyl peroxide (40% active on a chalk or EPDM carrier system).
4. 158 weight parts of lead II oxide.
5. 101 weight parts antimony trioxide.
6. 29 weight arts zinc borate.
7. 35 weight parts of silicon oil (in the viscosity range of 20–40 Pas).

With these examples, the fusible oxides or modifier components 4, 5 and 6 fuse at temperatures between 450° C. and 1200° C.

A composition mixed according to example 2.3 was exposed to the temperatures associated with a fire as follows. Several samples of composition 2.3 were taken. Each was exposed to constant temperature in an oven for a duration of two hours. Samples were exposed to constant temperatures between 400° C. and 1300° C. The appearance of each of the samples was studied after exposure. The composition began to show the effects of the fusion of components 4, 5 and 6 after exposure to a temperature of 450° C. Samples exposed to temperatures higher than this (for example 450–750° C.) show increased evidence of fusion; at lower temperatures (for example 450–750° C.) the appearance of the samples is that of a slightly fused mass, samples exposed to higher temperatures (for example 800–1210° C.) have a more glazed or ceramic appearance. The temperature range over which fusion and/or ceramification took place, while the composition remained cohesive, was the range of 450 to 1210° C. At temperatures above 1210° C. fusion occured to such a large extend that the composition flowed; it no longer displayed effective cohesion.

By way of illustrating one of the many possible uses of compositions according to the invention. FIG. 1 shows a cross section of an electrical cable formed using a composition according to the invention. A copper conductor 1 is surrounded by a silicone insulator 2. The silicone insulator 2 is a conventional silicone rubber extruded around the conductor 1. The silicone insulator is surrounded by a layer 3 formed from the composition described in Example 2.3. The layer is applied by extrusion over the layer 3 and aired in the conventional manner. The whole cable, which in this case incorporates two copper conductors and their surrounding layers, is itself further surrounded by a sheath 4. On exposure to a flame temperature of 950° C. the electrical performance and structure of the cable was maintained.

In the fire the layer of composition 3 fuses and loses its insulating properties. It is therefore essential that conductor 1 has a surrounding layer that maintains insulating properties during the fire. In this example the silicone insulation layer 2 forms on pyrolysis an insulating ash of S10$_2$ which is retained in place by the composition layer 3 and enables the cable to maintain its electrical performance in the fire.

Compositions according to the invention may also be based on organic polymer systems.

Examples of organic polymer based systems which fuse upon heating to form a rigid structure are as follows. It will be noted that in these examples the modifier, or mixture of components that fuses to provide a cohesive structure at elevated temperatures, is denoted by component 3. With these examples, the modifier component 3 fuses over a temperature range between 850° C. and 1100° C.:

EXAMPLE 3.1

1. 100 weight parts ethylene-propylene terpolymer.
2. 25–175 weight parts reinforcing filler.

3. 150–300 weight parts modifiers.
4. 1–10 weight parts coupling agent.
5. 1–20 weight parts crosslinking agent.
6. 1–10 weight parts free radical promoter.
7. 1–10 weight parts heat stabiliser.
8. 10–75 weight parts processing aid and anti-oxidants.

EXAMPLE 3.2

1. 100 weight parts ethylene-propylene diene-monomer.
2. 100–140 weight parts silica flour.
3. 60–80 weight parts antimony trioxide, 100–120 weight parts lead II oxide, and 10–30 weight parts zinc borate.
4. 3–5 weight parts organosilane.
5. 5–13 weight parts dicumyl peroxide (40% active on a chalk or EPDM carrier system).
6. 7–9 weight parts triallyl cyanurate.
7. 3–8 weight parts zinc oxide.
8. 40–50 weight parts processing oil, and 2–4 weight parts anti-oxidants.

EXAMPLE 3.3

1. 100 weight parts ethylene-propylene diene-monomer.
2. 120 weight parts silica flour.
3. 70 weight parts antimony trioxide, 110 weight parts lead II oxide, and 20 weight parts zinc borate.
4. 4 weight parts organosilane.
5. 10 weight parts dicumyl peroxide (40% active on chalk or EPDM carrier system).
6. 8 weight parts triallyl cyanurate.
7. 5 weight parts zinc oxide.
8. 45 weight parts processing oil, and 3 weight parts anti-oxidants.

EXAMPLE 3.4

By introducing fibrous materials into the system, a more coherent fused product may be achieved. An example containing a fibrous material is detailed below:
1. 100 weight parts ethylene-propylene terpolymer.
2. 25–175 weight parts reinforcing filler.
3. 125–300 weight parts modifiers.
4. 1–10 weight parts coupling agent.
5. 1–20 weight parts crosslinking agent.
6. 1–10 weight parts free radical promoter.
7. 1–10 weight parts heat stabiliser.
8. 10–75 weight parts processing aid and anti-oxidants.
9. 10–70 weight parts natural or synthetic aluminosilicate fibre.

EXAMPLE 3.5

A more specific example of an organic polymer based system that contains a fibrous material is:
1. 100 weight parts ethylene-propylene diene-monomer.
2. 80–150 weight parts silica flour.
3. 60–80 weight parts antimony trioxide, 80–125 weight parts lead II oxide, and 10–30 weight parts zinc borate.
4. 3–5 weight parts organosilane.
5. 5–13 weight parts dicumyl peroxide (40% active on a chalk or EPDM carrier system).
6. 7–9 weight parts triallyl cyanurate.
7. 3–8 weight parts zinc oxide.
8. 35–55 weight parts processing oil, and 2–4 weight parts anti-oxidants.
9. 40–60 weight parts natural or synthetic alumina or aluminosilicate fibres or fibres generated from dibasic rocks.

EXAMPLE 3.6

A still more specific example is:
1. 100 weight parts ethylene-propylene diene-monomer.
2. 120 weight parts silica flour.
3. 70 weight parts antimony trioxide, 110 weight parts lead II oxide and 20 weight parts zinc borate.
4. 4 weight parts organosilane.
5. 10 weight parts dicumyl peroxide (40% active on a chalk or EPDM carrier system).
6. 8 weight parts triallyl cyanurate.
7. 5 weight parts zinc oxide.
8. 45 weight parts processing oil, and 3 weight parts anti-oxidants.
9. 50 weight parts natural or synthetic alumina or aluminosilicate fibres or fibres generated from dibasic rocks.

EXAMPLE 4

The following is an example of an organic polymer based system which fuses upon heating to form a rigid structure:
1. 100 weight parts ethylene-propylene terpolymer.
2. 10–150 weight parts reinforcing filler.
3. 100–250 weight parts modifiers.
4. 1–10 weight parts coupling agent.
5. 1–20 weight parts crosslinking agent.
6. 1–10 weight parts free radical promoter.
7. 1–10 weight parts heat stabiliser.
8. 10–75 weight parts processing aid and anti-oxidants.

A more specific example is:
1. 100 weight parts ethylene-propylene diene-monomer.
2. 70–90 weight parts muscovite mica.
3. 60–80 weight parts antimony trioxide, 60–80 weight parts lead II oxide, 10–30 weight parts zinc borate and 20–40 weight parts lithium carbonate.
4. 3–5 weight parts organosilane.
5. 5–13 weight parts dicumyl peroxide (40% active on a chalk or EPDM carrier system).
6. 7–9 weight parts triallyl cyanurate.
7. 3–8 weight parts zinc oxide.
8. 35–45 weight parts processing oil, and 2–4 weight parts anti-oxidants.

A still more specific example is:
1. 100 weight parts ethylene-propylene diene-monomer.
2. 80 weight parts muscovite mica.
3. 70 weight parts antimony trioxide, 70 weight parts lead II oxide, 20 weight parts zinc borate and 30 weight parts lithium carbonate.
4. 4 weight parts organosilane.
5. 10 weight parts dicumyl peroxide (40% active on a chalk or EPDM carrier system).
6. 8 weight parts triallyl cyanurate.
7. 5 weight parts zinc oxide.
8. 40 weight parts processing oil, and 3 weight parts anti-oxidants.

The above compositions are particularly useful as coatings for electrical cables but it will be understood that they can be used to make any article, component or fitting for which continued performance is advantageous in the event of fire.

What is claimed is:

1. A composition for use as thermal insulation or as a barrier in articles that are required to function under transient elevated temperature conditions, comprising at least two components, a first of the two components, at temperatures up to approximately 300° C., being ductile or flexible, but which fuses and/or decomposes at temperatures above approximately 300° C. but below 1000° C., a second of the two components being dispersed within the first component, and the first component being cohesive at temperatures up to approximately 300° C. so as to retain the second component and stay substantially in place, the second component undergoing fusion and/or decomposition in transition to a temperature between 400° C. and 850° C., the second component being ductile or flexible at temperatures between 400° C. and 850° C. and being cohesive so as to stay substantially in place at temperatures between 400° C. and 850° C., wherein the first component is a silicone polymer and the second component includes an oxide, the oxide being treated or mixed with material to reduce the fusion and/or decomposition temperature of the second component to lie between 400° C. and 850° C., said oxide being an oxide of aluminum, silicon, magnesium or boron or a combination of one or more of aluminum, silicon, magnesium or boron oxides.

2. A composition according to claim 1 in which the first and second components are mixed so that the reaction products of the first component are dispersed throughout the second component at temperatures between 400° C. and 850° C., in the event of a fire.

3. A composition according to claim 1 including a third component which remains stable in a solid phase at temperatures between 400° C. and 850° C. so as to increase the viscosity of the fused second component.

4. A composition according to claim 1 wherein the material that reduces the fusion and/or decomposition temperature of the second component is a metal oxide or metal oxide precursor or a combination of metal oxides or metal oxide precursors.

5. A composition according to claim 4 in which the precursor is a metal carbonate or metal acetate.

6. A composition according to claim 1 in which the silicone polymer decomposes to a solid phase residue, the residue being dispersed within the second component when fused so as to increase its viscosity.

7. A composition according to claim 1 in which the silicone polymer is a silicone rubber.

8. A composition according to claim 1 in which said oxide is mica in the form of muscovite which has been treated with an alkali metal carbonate to reduce its temperature of fusion to around 850° C.

9. A composition according to claim 1 in which the material that reduces the fusion and/or decomposition temperature of the second component includes a borate.

10. A composition according to claim 9 in which the borate is zinc borate.

11. A composition according to claim 1 in which the material that reduces the fusion and/or decomposition temperature of the second component includes at least one metal oxide.

12. A composition according to claim 11 in which said metal oxide is selected from the group consisting of lead, strontium, calcium, iron, barium, yttrium, vanadium, potassium, chromium, tungsten, molybdenum, lithium, magnesium, sodium, zirconium and titanium.

13. A composition according to claim 1 in which the second component comprises materials which, upon fusion, form a water glass, phosphate glass, electronic glass, sulfate glass or borate glass.

14. A composition according to claim 1 in which the second component is non-deliquescent.

15. A composition according to claim 14 in which the second component is a lead glass or the raw materials for a lead glass.

16. A composition according to claim 1 in which the second component comprises a mixture of discrete particles of different oxides which fuse on heating to form in situ a glass.

17. A thermally insulating fire resistant composition comprising:

a polymer to provide integrity and ductility at ambient temperatures and throughout a first elevated range of temperatures, wherein the polymer is a silicone polymer;

a glass or fusible oxide component to provide integrity and ductility at a second temperature range, the lower end of the second temperature range being above the lower end of the first temperature range and the upper end of the second temperature range being above the upper end of the lower temperature range; and a refractory material which is stable and remains solid at all temperature conditions experienced up to a predetermined fire performance temperature.

18. A composition according to claim 17 wherein the polymer provides integrity and ductility at temperatures up to about 300° C., the glass or fusible oxide component provides integrity and ductility at temperatures between 400° C. and 850° C., and the refractory material is stable and remains solid at temperatures up to 1000° C.

19. A composition for use in the manufacture of thermally insulating fire resistance materials including a polymer; and a mixture of discrete particles of different oxides which fuse on heating to a temperature below a predetermined fire performance temperature to form in situ a low temperature fusing glass, wherein the polymer is a silicone polymer.

20. A composition according to claim 19 in which the silicone polymer decomposes to form oxides of silicone upon heating.

21. A composition according to claim 19 wherein the mixture fuses at a temperature below 1000° C.

22. A composition according to claim 21 in which the mixture fuses at a temperature in the range of 450° C. to 850° C.

23. A composition according to claim 19 in which the mixture includes a borate.

24. A composition according to claim 19 in which the mixture includes a metal oxide.

25. A composition according to claim 24 in which the metal oxide is lead oxide or antimony oxide or a mixture of lead and antimony oxides.

26. An electric cable comprising one or more electric conductors, a layer of silicone insulation surrounding the conductor, and thermal insulation in the form of a glass or non crystalline thermally insulating fire resistant composition with a fusion temperature below 1000° C. surrounding the silicone insulation, the thermal insulation being produced by a method comprising adding an alkali metal oxide, or a mixture of alkali metal oxides and precursors to the alkali metal oxides to a refractory oxide, and fusing the resultant composition, in which the refractory oxide comprises aluminum oxide, silicon oxide, magnesium oxide and compounds of two or more of these oxides.

27. A composition for use as thermal insulation or as a barrier in articles that are required to function under transient elevated temperature conditions, comprising at least two components, a first of the two components, at temperatures up to approximately 300° C., being ductile or flexible, but which fuses and/or decomposes at temperatures above approximately 300° C. but below approximately 1000° C., a second of the two components being dispersed within the first component, and the first component being cohesive at temperatures up to approximately 300° C. so as to retain the second component and stay substantially in place, the second component undergoing fusion and/or decomposition in transition to a temperature between 400° C. and 850° C., the second component being ductile or flexible at a temperature between 400° C. and 850° C., and being cohesive so as to stay substantially in place at temperatures between 400° C. and 850° C., wherein the first component is silicone rubber.

28. A composition for use as thermal insulation or as a barrier in articles that are required to function under transient elevated temperature conditions, comprising at least two components, a first of the two components, at temperatures up to approximately 300° C., being ductile or flexible, but which fuses and/or decomposes at temperatures above approximately 300° C. but below 1000° C., a second of the two components being dispersed within the first component, and the first component being cohesive at temperatures up to approximately 300° C. so as to retain the second component and stay substantially in place, the second component undergoing fusion and/or decomposition in transition to a temperature between 400° C. and 850° C., the second component being ductile or flexible at temperatures between 400° C. and 850° C. and being cohesive so as to stay substantially in place at temperatures between 400° C. and 850° C., wherein the first component comprises a polymer or reagents that may be reacted to form a polymer and the second component includes an oxide, the oxide being treated or mixed with material to reduce the fusion and/or decomposition temperatures of the second component to lie between 400° C. and 850° C., said oxide being mica in the form of muscovite.

29. A composition for use in the manufacture of thermally insulating fire resistant materials including a polymer; and a mixture of discrete particles of different oxides which fuse on heating to a temperature below a predetermined fire performance temperature to form in situ a low temperature fusing glass, wherein one of the oxides is mica in the form of muscovite.

30. A composition according to claim 29 wherein the mixture fuses on heating to a temperature below 1000° C.

31. A composition for use as thermal insulation or as a barrier in articles that are required to function under transient elevated temperature conditions, comprising at least two components, a first of the two components, at temperatures up to approximately 300° C., being ductile or flexible, but which fuses and/or decomposes at temperatures above approximately 300° C. but below 1000° C., a second of the two components being dispersed within the first component, and the first component being cohesive at temperatures up to approximately 300° C. so as to retain the second component and stay substantially in place, the second component undergoing fusion and/or decomposition in transition to a temperature between 400° C. and 850° C., the second component being ductile or flexible at temperatures between 400° C. and 850° C., and being cohesive so as to stay substantially in place at temperatures between 400° C. and 850° C., wherein the first component comprises a polymer or reagents that may be reacted to form a polymer and the second component includes an oxide, the oxide being treated or mixed with material to reduce the fusion and/or decomposition temperature of the second component to lie between 400° C. and 850° C., said oxide including a lead glass or the raw materials for a lead glass.

* * * * *